United States Patent [19]
Tamaki

[11] Patent Number: 5,167,719
[45] Date of Patent: Dec. 1, 1992

[54] METHOD FOR REMOVAL OF SPRAYED-ON ASBESTOS

[75] Inventor: Masaru Tamaki, Hokkaido, Japan

[73] Assignees: Kabushiki Kaisha Tokkihan; Osaka Gas Co. Ltd; Mitsubishi Corp., all of Japan

[21] Appl. No.: 599,823

[22] Filed: Oct. 19, 1990

[30] Foreign Application Priority Data

Oct. 19, 1989 [JP] Japan ................... 1-270343

[51] Int. Cl.⁵ ............... B08B 5/04; B01D 33/00
[52] U.S. Cl. ................................. 134/21; 134/10; 134/33; 210/388; 210/787
[58] Field of Search ............... 134/21, 10, 33, 15; 210/388, 806, 787; 55/223, 228, 235, 237, 238, 239, 248, 255, 256

[56] References Cited

U.S. PATENT DOCUMENTS

| | | | |
|---|---|---|---|
| 3,842,461 | 10/1974 | Wurster | 55/229 |
| 3,970,549 | 7/1976 | Ennis et al. | 210/388 |
| 3,970,552 | 7/1976 | Bongert | 210/388 |
| 4,137,159 | 1/1979 | Sawyer | 210/388 |
| 4,388,090 | 6/1983 | Streeter | 55/229 |
| 4,434,061 | 2/1984 | McDowell | 210/787 |
| 4,872,920 | 10/1989 | Flynn et al. | 134/21 |
| 4,957,512 | 9/1990 | Denisov et al. | 55/223 |
| 5,021,095 | 6/1991 | Tamaki | 134/21 |
| 5,021,166 | 6/1991 | Torpey | 210/787 |
| 5,030,360 | 7/1991 | Grainger et al. | 210/806 |

*Primary Examiner*—Theodore Morris
*Assistant Examiner*—Saeed Chaudhry
*Attorney, Agent, or Firm*—Larson and Taylor

[57] ABSTRACT

The invention provides a method for removing the sprayed-on asbestos, the method comprising the steps of:

(1) removing the asbestos-containing materials sprayed, and sucking up the asbestos-containing materials by a suction hood before they drop onto the floor or the ground;

(2) conveying the absorbed asbestos-containing air by transport means to a receiver tank containing a liquid wherein the air is bubbled, and sucking up the bubbled air by a suction blower; and (3) transferring the asbestos-containing liquid in the receiver tank to a dehydrator by a discharge pump to separate the asbestos-containing solids from the liquid, and delivering the separated liquid directly to the receiver tank or to the transport means by a return pump for returning the liquid to the receiver tank, and an apparatus therefor.

6 Claims, 3 Drawing Sheets

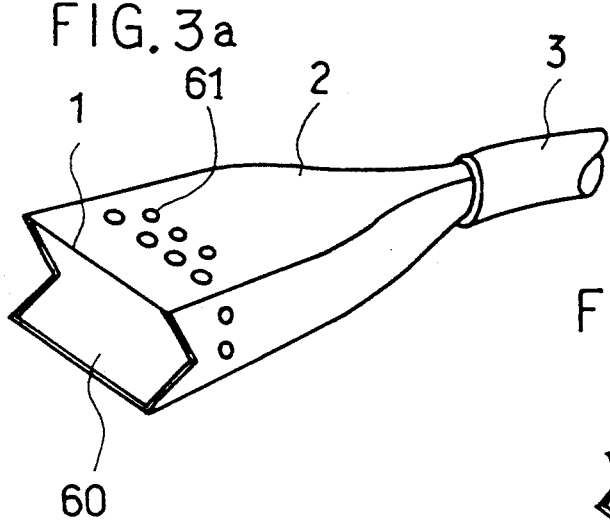
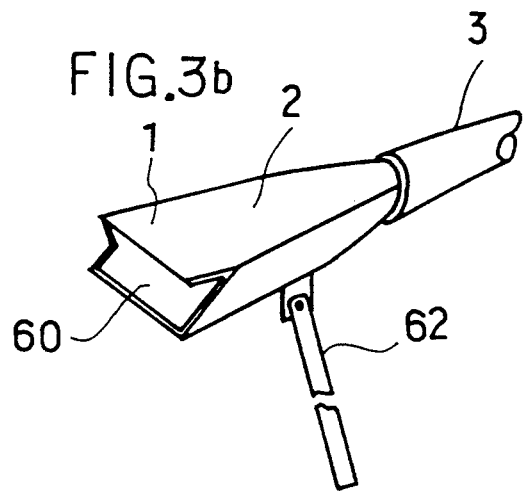
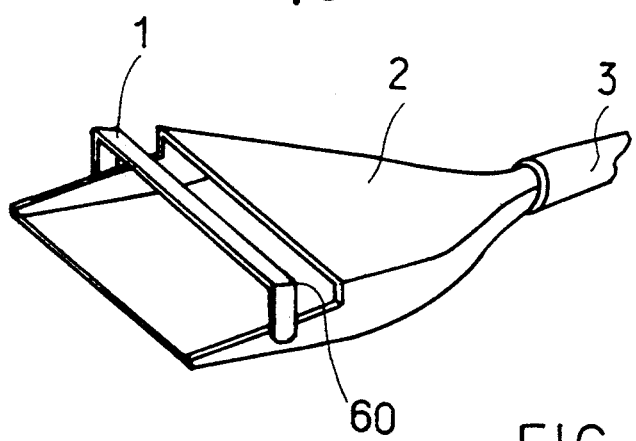
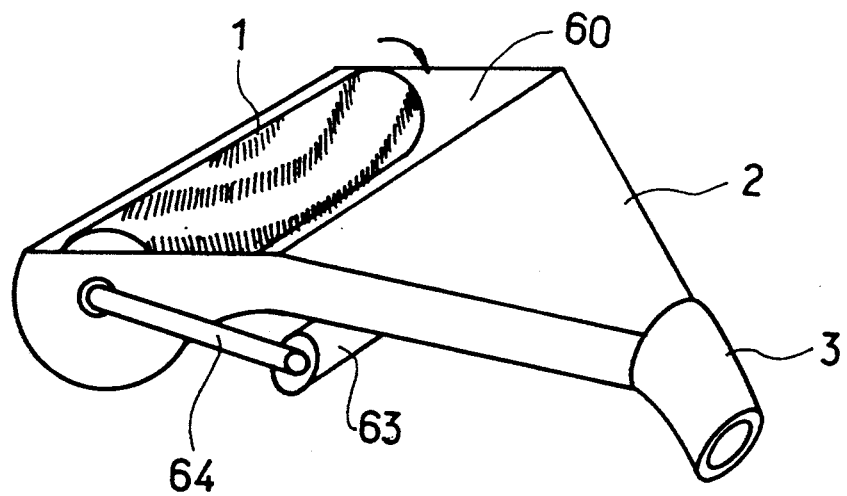

METHOD FOR REMOVAL OF SPRAYED-ON ASBESTOS

BACKGROUND OF THE INVENTION

The present invention relates to a method for removing the sprayed-on asbestos, especially the asbestos sprayed on the surface of a building, and to an apparatus therefor.

Currently there is a great demand for removal of the asbestos sprayed over buildings. However, the dust and the waste produced by the asbestos removal operation adversely affect the human body, posing a serious social issue.

The asbestos sprayed on buildings have been heretofore manually removed and collected by the following method. To prevent the scattering of asbestos dust to outside, the work-place is enclosed with a plastics sheet, and a suction blower with a filter is disposed in the enclosed space for the suction of the asbestos (resulting in exposure of the space to a negative pressure). The sprayed-on asbestos is scraped off onto the floor by a scraper or a brush while spraying water or a wetting agent into the air or over the sprayed-on asbestos to reduce the extent of scattering of the asbestos to be removed. The asbestos fibers dropped on the floor are collected by a broom or a vacuum cleaner.

The above conventional asbestos removal operation has the problems that the asbestos is densely suspended in the atmosphere of the enclosed space, markedly deteriorating the work environment and decreasing the work efficiency.

BRIEF SUMMARY OF THE INVENTION

It is an object of the present invention is to provide a method for removing the sprayed-on asbestos, especially the asbestos sprayed on the surface of buildings including wall surfaces, ceiling surfaces and the like, the method being adapted to keep the work environment safe and sanitary for the operators and to conduct the removal with a high efficiency, and an apparatus therefor.

To achieve the object of the present invention, I conducted extensive research and accomplished the following invention. According to the invention, there is provided a method for removing the sprayed-on asbestos, the method comprising the steps of:

(1) removing the asbestos-containing materials sprayed, and sucking up the asbestos-containing materials by a suction hood before they drop onto the floor or the ground;

(2) conveying the absorbed asbestos-containing air by transport means (in case of FIG. 1, the transport means comprising a hose 3, a manifold 4 and a first inlet pipe 5) to a receiver tank containing a liquid wherein the air is bubbled, and sucking up the bubbled air by a suction blower; and (3) transferring the asbestos-containing liquid in the receiver tank to a dehydrator by a discharge pump to separate the asbestos-containing solids from the liquid, and delivering the separated liquid to the receiver tank or to the transport means by a return pump for returning the liquid to the receiver tank.

In accordance of the present invention, there is further provided an apparatus for removing the sprayed-on asbestos, the apparatus comprising:

(i) a suction hood;

(ii) a receiver tank connected to the suction hood through transport means (which comprises a hose 3, a manifold 4 and a first inlet pipe 5 in case of FIG. 1);

(iii) a suction blower for sucking up the air from the receiver tank;

(iv) a discharge pump for discharging the liquid from the receiver tank;

(v) a dehydrator for separating the asbestos-containing solids from the asbestos-containing liquid discharged from the discharge pump;

(vi) a discharge pipe which connects a liquid phase portion of the receiver tank to the dehydrator and which has the discharge pump therein;

(vii) a return pump for sucking the liquid discharged from the dehydrator; and (viii) a return pipe which connects the discharge opening of the return pump to the transport means or the receiver tank to return the liquid discharged from the dehydrator to the receiver tank.

The present invention achieves the following results.

1. Almost all asbestos-containing materials scraped off from the wall surfaces and the like by a scraper or like removing means are sucked up by the suction blower lest they drop onto the floor or the ground. Therefore the removal is conducted efficiently with only a small amount of the dust suspended in the working space compared with conventional methods.

2. The asbestos-containing air is bubbled in the receiver tank and thus almost all asbestos materials are collected in the receiver tank without scattering.

3. The asbestos materials not collected in the water of the receiver tank remain in the discharged air, but can be easily removed by the subsequent procedure because they are substantially wetted.

4. The asbestos materials collected in the water of the receiver tank are dehydrated by the dehydrator and properly wetted, facilitating the handling. When mixed with cement and dried, the asbestos is easily fixed. Thereafter, secondary environmental pollution would be unlikely to occur. The dehydrated asbestos may be filled into bags and the bags can be buried in the ground.

5. The water discharged from the dehydrator is returned to the receiver tank for re-use, whereby the amount of water needed for the apparatus of the invention is decreased and the costs for disposing of the water after completion of the operation can be diminished.

The present invention will become more apparent from the following detailed description with reference to the accompanying drawings. The claimed methods and apparatus may be variously modified by those skilled in the art without deviation from the scope of the invention. However, such modifications are made without prejudice to the benefit of the invention.

BRIEF DESCRIPTION OF THE DRAWING

FIGS. 3a, 3b and 3c show suction hoods in perspective view, and FIG. 3d is a perspective view of a suction hood partly cut out in cross section.

DETAILED DESCRIPTION OF THE INVENTION

Figure 1:
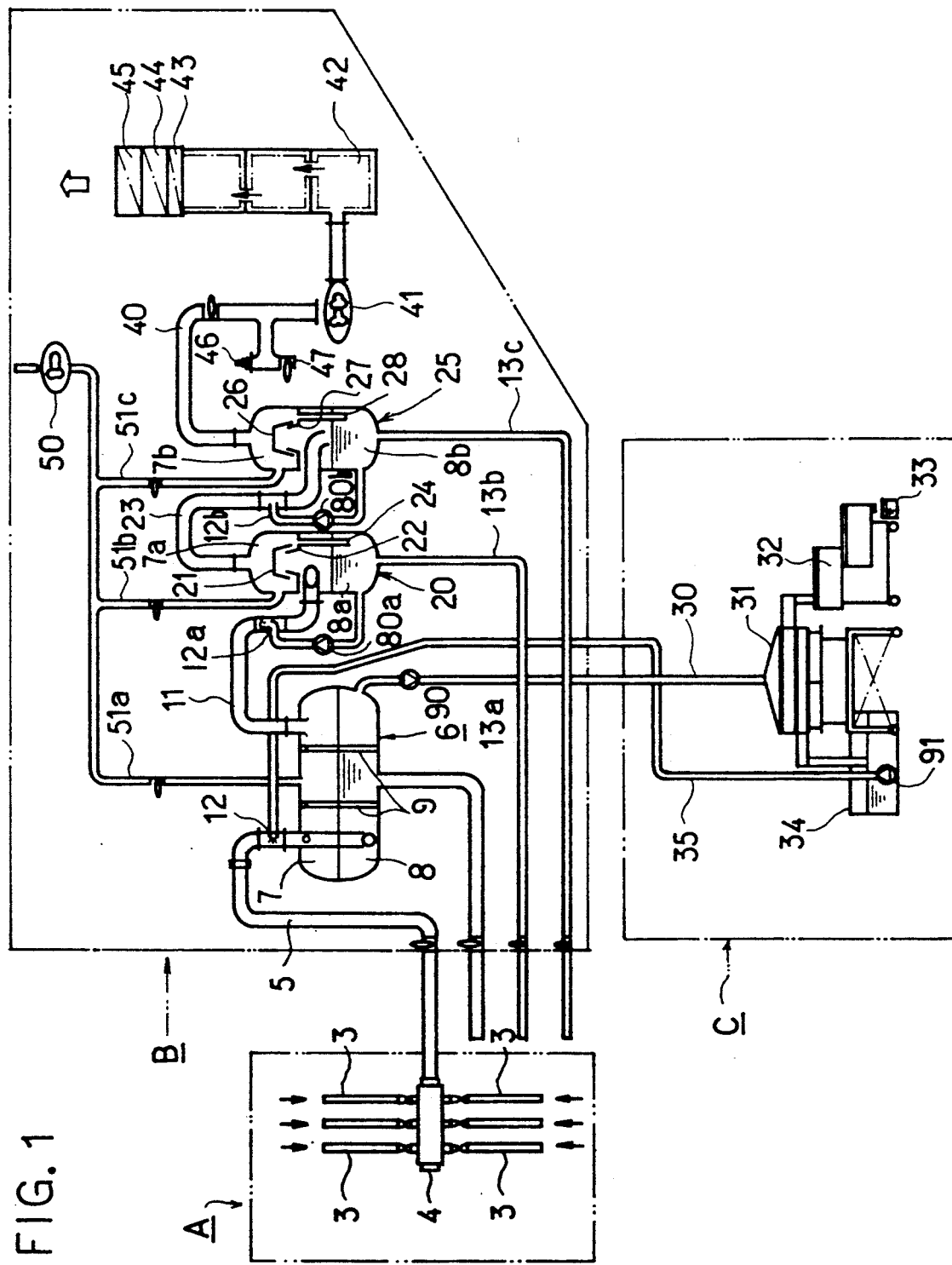
FIG. 1 is a block diagram schematically showing the method of the present invention for removing the sprayed-on asbestos and an apparatus therefor.
Figure 2:
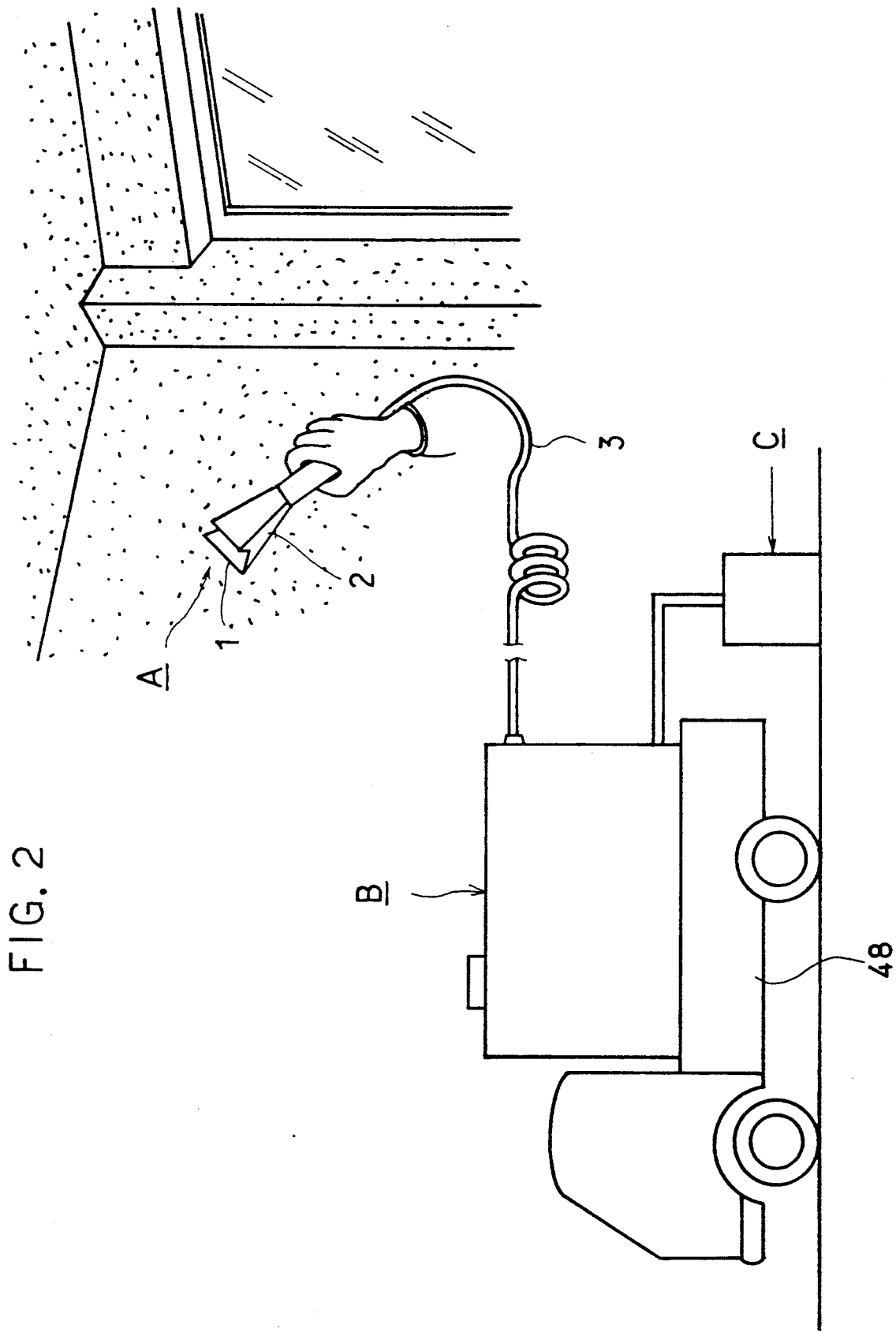
FIG. 2 illustrates a specific embodiment of the invention.

The present invention will be described below in more detail according to embodiments of the invention with reference to the drawings. In the embodiments as shown in FIGS. 1 and 2, the symbol A means an asbestos-removing portion of the apparatus; the symbol B, a dust-collecting portion thereof; and the symbol C, an asbestos-recovering portion thereof.

A suction hood 2 may be provided in various forms as shown in FIGS. 3a, 3b, 3c and 3d. The suction hood 2 has a suction opening 60 and scraping means 1 in the neighborhood thereof. The scraping means 1 may have a sharp edge like that of a knife, but need not have such sharp edge or may be a brush of steel in removing a soft layer of asbestos.

The scraping means 1 of the type integrally formed with the hood 2 as shown in FIGS. 3a, 3b are efficiently operated. Alternatively the means 1 of the type separately produced as indicated in FIG. 3c is usable. In removing a hard layer of asbestos, it is possible to use as the means 1 an electrically operated brush which is rotatable along with a shaft 64 driven by a motor 63 as shown in FIG. 3d.

The asbestos sprayed over the surface of a building is removed by the scraping means 1. Since the removed asbestos is sucked into the suction opening provided close to the means 1, the asbestos fibers are unlikely to scatter and to drop onto the ground or the floor and thus the amount of labor involved in collecting the dropped asbestos is reduced. That is to say, the removing and sucking of asbestos are conducted substantially at the same time.

The suction hood 2 of the type which has at least one small opening 61, about 5 mm in diameter, on the surface thereof, is convenient to use because such hood can not only absorb the asbestos fibers suspended in the vicinity thereof but prevent the suction hood from being sucked onto the wall surface or the ceiling and becoming immovable. The small opening or openings 61 of the suction hood 2 may be in any of forms selected from circular, rectangular and like forms. For removal of an asbestos layer on the ceiling, the suction hood 2 having a rod 62 attached thereto as shown in FIG. 3b serves to increase the work efficiency.

The suction hood 2 is attached at its rear end to a flexible hose 3 to facilitate the operation. A plurality of hoses 3 are provided and convergently connected to a manifold 4. The manifold 4 is linked by a first inlet pipe 5 to a receiver tank 6. In the embodiment of FIG. 1, transport means comprises the hose 3, the manifold 4 and the first inlet pipe 5.

In a work-place for the removal operation on a small scale, the hose 3 may be directly linked to the first inlet pipe 5 without use of the manifold 4.

The receiver tank 6 contains water by about 50% of the capacity and is separated into a gas phase portion 7 and a liquid phase portion 8. Baffles 9, 9 are provided inside the tank 6 to prevent the turbulence of water.

The forward end of the first inlet pipe 5 is positioned near the bottom of the liquid phase portion 8 in the tank 6 so that the asbestos-containing air sucked at and delivered from the hood 2 by virtue of the suction force of a suction blower 41 is bubbled in the water. Almost the whole of the asbestos in the air stream is collected in the water. But the fibers within the bubbles are rather difficult to collect. The air bubbled in the water is released into the gas phase portion 7 in the tank 6 and admitted into a scrubber tank 20 after passing through a second inlet pipe 11 communicating with the tank 20 at a position near the central body part of the tank 20.

A shower means 12 is disposed in the first inlet pipe 5 to produce shower with the water which is sent from the tank 6 to the means 12 via a discharge pipe 30 having a discharge pump 90, a dehydrator 31, a return pipe 91 and return pump 35.

The asbestos-containing air stream passing through the first inlet pipe 5 is subjected to shower formed by the shower means 12 and thus the asbestos is released into the liquid phase portion 8 of the tank 6 while being in contact with the water. Since the asbestos is wetted by the shower, an increased amount of the asbestos is trapped in the liquid phase portion 8. The apparatus of the invention is made compact by the arrangement of the built-in shower means 12 in the pipe 5. The bubbling in the liquid phase portion 8 serves not only to bring the asbestos into more frequent contact with the water but also to divide the slurry lumps in the water and to eliminate the air from the felt-like asbestos fibers. When a large amount of bubbles is produced in the tank 6, the asbestos is transported together with the water to the scrubber tank 20. To avert this phenomenon, an anti-foaming agent is preferably incorporated into the water in case of removing an asbestos layer which is likely to form bubbles.

Water is the most economical as the liquid in the tank 6. Yet a liquid other than water may be used.

Since water droplets of larger size are contained in the air stream delivered to the scrubber tank 20 via the second inlet pipe 11, the air stream is subjected to the action of a cyclone-type dust collector in the tank 20. The tank 20 includes a drain board 21 and a pan 22. The air stream, together with the water splash, is collided with the umbrella-shaped drain board 21, whereupon the water droplets are enlarged and are collected by the pan 22, while only the air stream goes further into a third inlet pipe 23. The water collected in the pan 22 is returned to a liquid phase portion 8a in the tank 20 by passing through a return pipe 24. The forward end of the lower portion of the pipe 24 is submerged in the water reserved in the liquid phase portion 8a. A scrubber tank 25 contains water by 15% of the capacity.

The air stream sent through the third inlet pipe 23 to the scrubber tank 25 is passed in the same manner in the tank 25 as in the tank 20 until it reaches a fourth inlet pipe 40. Indicated at 26 is a drain board; at 27, a pan and at 28, a return pipe.

The opening ends of the second and third inlet pipes in the scrubber tanks are so oriented and shaped that the opening end of the former pipe is intended to form cyclone and that of the latter is intended to cause collision with the surface of water, or vice versa. Or the two opening ends may be of the same type. Only one type may be adopted when a high dust collecting efficiency is achievable.

The embodiment as shown in FIG. 1 is designed to suck up the water in the scrubber tanks 20, 25 by pumps 80a, 80b, respectively, for use as the water in shower means 12a, 12b disposed in the inlet pipes 11, 23, respectively leading to the tanks 20, 25. This arrangement is intended to reduce the amount of water to be used. When a large amount of bubbles occur in the scrubber tanks 20, 25, an anti-foaming agent is added to the water reserved in the tanks to prevent the water from being carried away downstream together with the bubbles, when so required.

The tanks 20, 25, although not provided with water-spraying means, are termed scrubber tanks in the specification and the appended claims since the water-spraying nozzles of the shower means 12a, 12b are provided in the inlet pipes 11, 23 laid for the feed of asbestos-containing air into each tank. The shower means 12a, 12b may be provided in the tanks 20, 25.

The upper part of a gas phase portion 7b in the scrubber tank 25 is communicated with the suction blower 41 through the fourth inlet pipe 40. The air sucked up from the gas phase portion 7b of the tank 25 by the suction blower 41 passes through the fourth inlet pipe 40, a silencer 42 and a filter and is drawn off toward outside. The filter comprises a prefilter 43, a medium-performance filter 44 and a high-performance filter 45. The medium-performance filter 44 is adapted to remove asbestos fibers of smaller size, and the high-performance filter 45 is adapted to remove asbestos fibers of smallest size. In removal of asbestos fibers of the same size, the high-performance filter collects the fibers with the highest efficiency. In other words, a multi-layer filter composed of a plurality of filters with different filter performances is used. It is possible to employ either a combination of filters of same performance superposed on each other or a single filter of great thickness. The above composite filter is economical because it not only operates with a higher efficiency but extends the potential continuous operating time. The suction blower 41 of the dry type, e.g. air-cooling type, is used to prevent the clogging of the filters 43, 44, 45 with water. When a suction blower is positioned upstream of the scrubber tank, a blower of the wet type adapted to be cooled with water is also usable. Indicated at 46 is a vacuum safety valve and at 47, an unloading valve.

The scrubber tanks 20, 25 and the filters 43, 44, 45 act as secondary dust collectors for collecting the asbestos which has not been trapped by the receiver tank 6. Also usable as secondary dust collectors are dust collectors utilizing scrubbing such as a spray scrubbing tower, water-jet scrubber, venturi scrubber, cyclone scrubber, Doyle scrubber, axial scrubber (e.g. "Rotoclone", trademark for product of American Air Filter), etc.; those utilizing a centrifugal force such as cyclones; and those employing filter means such as a filter, bag filter and the like. Since the asbestos contained in the air and discharged from the receiver tank 6 is wetted, it is preferable to use a secondary collector of the wet type which uses water.

The receiver tank 6 and the scrubber tanks 20, 25 are connected at each gas phase portion to a pressure blower 50 by pressure pipes 51a, 51b, 51c, respectively. After removal of the asbestos, the slurries containing large amounts of asbestos must be drawn off from the tanks. The slurries can be easily withdrawn by feeding the air from the pressure blower 50 through the pressure pipes to the gas phase portions of the tanks with the communication valves of the tanks closed. This method can diminish the time involved for taking out the slurries. Designated 13a, 13b, 13c in FIG. 1 are drain pipes for use in the release of the water from the tanks.

I will describe below the continuous withdrawal of asbestos from the receiver tank 6 which is one of the most important characteristics of the invention. The symbol C in FIG. 1 represents a device for removing the solids from the slurries. After continuous removal of an asbestos layer composed of asbestos, mortar and the like, the asbestos and other components in the water within the receiver tank 6 reach high concentrations at which the continuous operation is rendered impossible. The continuous operation is made possible by the provision of the following structure. The liquid phase portion 8 of the receiver tank 6 is connected by the discharge pipe 30 to a vibrating-type dehydrator 31. The discharge pump 90 is arranged in the discharge pipe 30. Alternatively a submerged-type pump may be provided as the discharge pump 90 within the liquid phase portion 8 of the tank 6. The suction of the liquid by the pump 90 is preferably done at the intermediate part of the liquid phase portion 8 in the tank 6, not at the upper and lower parts thereof, so as to decrease the possibility of the air and the foreign matters being sucked and to lessen the suction of foreign matters.

Other dehydrators than the vibrating-type dehydrator can be used and include, for example, a centrifuge, filter press, screen, strainer, cyclone separator, bag-filter type means, vacuum filter, etc. These means can be intermittently operated, or a plurality of these means may be alternately operated. The vibrating-type dehydrator is desirable because such dehydrator singly arranged can be continuously operated and the dehydrator can efficiently separate the solids.

The vibrating-type dehydrator 31 has a 30-mesh screen of stainless steel net plate. The asbestos-containing slurry is delivered through the discharge pipe 30 onto the screen being vibrated by a vibrator, whereupon the slurry is separated into the solids and the water. The solids resulting from a certain extent of dehydration are treated by a mixer 32 and filled into a container 33 for disposal.

The solids may be mixed with cement charged in the mixer 32 before filling into the disposal container 33. A preferred mixing ratio of asbestos-containing solids:-cememt:water is approximately 1:2:3.

The water released from the vibrating-type dehydrator 31 is reserved in the tank 34 and is sucked by the return pump 91 so that the water is conveyed to the first inlet pipe 5 near the inlet of the receiver tank 6 by way of the return pipe 35 and is showered in the pipe 5. When the water in the tank 6 has become short, the tank 34 is replenished with water. Since the asbestos coming from the receiver tank 6 is wetted, at least a wet-type dust collector is preferably used as a secondary one.

According to the invention, the water in the receiver tank 6 is used while being circulated, whereby the amount of water to be used is decreased and the amount of water to be disposed of after the operation is reduced. Hence the apparatus of the invention is economical.

In accordance with the invention, the asbestos sprayed on the surface of walls inside and outside buildings can be removed. Because the work-place is covered with a plastics sheet by a simple procedure, the removal can be easily done inside a building.

Since the apparatus of the invention has a compact structure, a truck can be loaded, as shown in FIG. 2, with at least the portion of the apparatus enclosed with a chain line as a dust-collecting portion B in FIG. 1 together with the engine for driving the suction blower 41. Thus the apparatus can be easily transported.

Stated more specifically, a 5.5-ton truck or trailer can be loaded with the apparatus of the type which has a receiver tank 6, 1.2 m in diameter and 1.8 m in length, a scrubber tank 20, 0.8 m in diameter and a scrubber tank 25, 0.8 m in diameter, along with the engine for driving the suction blower.

In case of removal of asbestos on a high ceiling, it takes much time to assemble a scaffold. The apparatus loaded on a truck can be used on other jobsites during the assembling of the scaffold, thereby enabling effective utilization.

An experiment was conducted using the apparatus of the invention in which the receiver tank 6 was exposed to a pressure of −6120 mmAq, the first inlet pipe 5 had an inside diameter of 150 mm and a length of 200 m, the hose 3 had an inside diameter of 50 mm and five suction hoods of the shape as shown in FIG. 3a. The experiment showed the following. Since the asbestos-containing materials were satisfactorily sucked up by the apparatus, the apparatus was proved to be useful also for the removal of asbestos in high-rise buildings. For use of the apparatus in a high-rise building, the first inlet pipe can be extended or the apparatus may be disassembled and assembled on site.

Since the receiver tank 6 can remove about 95% of asbestos, even the embodiment of the invention without any other dust collector downstream of the tank 6 can be employed as a preliminary method or preliminary apparatus for removing asbestos, and can be applied for removal of sprayed-on glass wool or rock wool.

I claim:

1. A method for removing sprayed-on asbestos, the method comprising the steps of:
   (1) removing asbestos-containing materials by a suction hood before they drop onto the floor or the ground to provide adsorbed asbestos-containing air;
   (2) conveying the absorbed asbestos-containing air through an inlet pipe connected to at least one suction hose by means of a suction force or a suction blower to a receiver tank containing a liquid wherein the air is bubbled so as to provide asbestos-containing liquid; sucking up the bubbled air by a suction blower; and
   (3) transferring the asbestos-containing liquid in the receiver tank to a dehydrator by a discharge pump to separate the asbestos-containing solids form the liquid, and delivering the separated liquid to the receiver tank through a return pipe for returning the liquid to the receiver tank.

2. A method according to claim 1 wherein the asbestos present in the air discharged from the receiver tank is removed by a secondary dust collector provided either between the receiver tank and the suction blower or downstream of the suction blower.

3. A method according to claim 1 or 2 wherein the asbestos present in the air discharged form the receiver tank is removed by a scrubber provided between the receiver tank and the suction blower and is further removed by a filter arranged downstream of the suction blower.

4. A method according to claim 1 wherein the separated liquid is delivered to the inlet pipe through the return pipe by the return pump, is showered in the inlet pipe and then is delivered to the receiver tank with the absorbed asbestos-containing air.

5. A method according to claim 1 or 4 wherein the dehydrator is of the vibrating type adapted to receive the materials to be removed on a vibrating screen and to separate the solids form the liquid.

6. A method according to claim 1 or 4 wherein the asbestos present in the air discharged form the receiver tank is removed by a scrubber provided between the receiver tank and the suction blower and is further removed by a filter arranged downstream of the suction blower, an the dehydrator is of the vibrating type adapted to receive the materials to be removed on a vibrating screen and to separate the solids for the liquid.

* * * * *